United States Patent [19]

Halasa et al.

[11] Patent Number: 5,239,009
[45] Date of Patent: Aug. 24, 1993

[54] HIGH PERFORMANCE SEGMENTED ELASTOMER

[75] Inventors: Adel F. Halasa, Bath; Wen-Liang Hsu, Copley; Brian J. Doucet, Akron; Laurie E. Austin, Hartville, all of Ohio

[73] Assignee: The Goodyear Tire & Rubber Company, Akron, Ohio

[21] Appl. No.: 777,035

[22] Filed: Oct. 16, 1991

[51] Int. Cl.$^5$ .................... C08F 293/00; C08F 294/04
[52] U.S. Cl. .................... 525/258; 525/259; 525/271; 525/314
[58] Field of Search ................ 525/258, 259, 271, 314

[56] References Cited

U.S. PATENT DOCUMENTS

| | | | |
|---|---|---|---|
| 3,937,760 | 2/1976 | Cole et al. | 260/880 B |
| 4,304,886 | 12/1981 | Bean, Jr. et al. | 525/314 |
| 4,377,665 | 3/1983 | Shiraki et al. | 525/250 |
| 4,463,133 | 7/1984 | Takeuchi et al. | 525/99 |
| 4,616,065 | 10/1986 | Hargis et al. | 525/99 |
| 4,696,986 | 9/1987 | Halasa et al. | 526/181 |
| 4,730,025 | 3/1988 | Bell et al. | 525/332.3 |
| 4,782,119 | 11/1988 | Tsutsumi et al. | 525/314 |
| 4,843,120 | 6/1989 | Halasa et al. | 525/53 |
| 4,908,401 | 3/1990 | Ohara et al. | 524/495 |
| 4,935,471 | 6/1990 | Halasa et al. | 525/359.1 |
| 4,940,756 | 7/1990 | Brockhuis et al. | 525/237 |
| 4,981,911 | 1/1991 | Herrmann et al. | 525/258 |
| 5,061,758 | 10/1991 | Hellermann et al. | 525/193 |
| 5,070,148 | 12/1991 | Hsu et al. | 525/316 |
| 5,100,967 | 3/1992 | Wolpers et al. | 525/314 |

FOREIGN PATENT DOCUMENTS

| | | |
|---|---|---|
| 0263054 | 9/1987 | European Pat. Off. . |
| 0384033 | 12/1989 | European Pat. Off. . |
| 2158076 | 3/1985 | United Kingdom . |
| 2200123 | 12/1986 | United Kingdom . |

*Primary Examiner*—John Kight, III
*Assistant Examiner*—Rachel F. Johnson
*Attorney, Agent, or Firm*—Alvin T. Rockhill

[57] ABSTRACT

It is highly desirable for tire treads to exhibit good traction characteristics such as good wet skid resistance. However, it has traditionally been very difficult to improve the traction characteristics of a tire without sacrificing rolling resistance and tread wear. The high performance segmented elastomers of this invention offer a unique combination of desirable characteristics for utilization in making tire tread compositions. For instance, the rubbery polymers of this invention can be made into tire treads which exhibit outstanding traction characteristics while maintaining good rolling resistance and tread durability. This invention more specifically reveals a rubber polymer which has an excellent combination of properties for use in making tire treads which is comprised of repeat units which are derived essentially from at least one conjugated diene monomer, wherein the first segment has a number average molecular weight which is within the range of about 25,000 to about 350,000; and (b) a final segment which is comprised of repeat units which are derived from 1,3-butadiene, isoprene, and styrene, wherein the repeat units in the final segment are in essentially random order, and wherein the final segment has a number average molecular weight which is within the range of about 25,000 to about 350,000.

13 Claims, No Drawings

HIGH PERFORMANCE SEGMENTED ELASTOMER

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor which determines the life of the tire.

The traction, tread wear, and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance various mixtures of styrene-butadiene rubber and polybutadiene rubber are commonly used as a rubber material for automobile tire treads. However, such blends are not totally satisfactory for all purposes.

Carbon black is generally included in rubber compositions which are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved.

U.S. Pat. No. 5,070,148 discloses a segmented elastomer which can be utilized in tire treads which offer good wet skid resistance, low rolling resistance, good tread wear characteristics and good abrasion resistance. The segmented elastomers disclosed in U.S. Pat. No. 5,070,148 are comprised of: (a) a first segment which is comprised of repeat units which are derived from isoprene having a microstructure wherein there are from about 75% to about 98% 1,4-linkages and from about 2% to about 25% 3,4-linkages and wherein the first segment has a number average molecular weight which is within the range of about 25,000 to about 350,000; and (b) a second segment which is comprised of repeat units which are derived from 30 to 95 weight percent 1,3-butadiene and from 5 to 70 weight percent styrene, wherein the sum of (1) the product of 1.7 and the weight percent of styrene in the second segment and (2) the percentage of 1,2-butadiene linkages in the second segment is within the range of about 50% to about 92%, and wherein the second segment has a number average molecular weight which is within the range of about 50,000 to about 350,000.

SUMMARY OF THE INVENTION

The high performance rubbery polymers of this invention have excellent properties for incorporation into the rubber compounds used in making tire treads. The rubbery polymers of this invention can be employed to improve the wet skid resistance and traction characteristics of tires without sacrificing tread wear or rolling resistance. A highly desirable combination of tire characteristics can be attained which cannot be achieved by utilizing conventional techniques. These improvements are believed to be attributable to the unique morphology associated with the rubbery polymers of this invention.

High performance rubbers of this invention are made by a two step polymerization process. In the first step of the process, a conjugated diene monomer is polymerized utilizing a lithium initiator. This step is carried out in the substantial absence of polar modifiers. Generally, one diene monomer, such as 1,3-butadiene or isoprene, will be utilized in this step. However, it is possible to utilize a combination of conjugated diene monomers in this step. Vinyl aromatic monomers, such as styrene, can also be included in cases where multiple monomers are utilized in the first step of the polymerization. Due to differing rates of reactivity and the absence of polar modifiers, the first segment formed in cases where multiple monomers are utilized will be blocky with there being tapers between the blocks. For instance, 1,3-butadiene has a rate of polymerization which is approximately four times faster than that of isoprene and isoprene exhibits a rate of polymerization which is approximately six times faster than that of styrene. Accordingly, in cases where a combination of 1,3-butadiene, isoprene and styrene are utilized in the first step of the polymerization, a first segment which is comprised mostly of repeat units which are derived from 1,3-butadiene will be formed. A second segment which is comprised predominantly of repeat units which are derived from isoprene will be formed next with a final segment which is comprised mostly from repeat units which are derived from styrene being formed last. The amount of monomers utilized in the first step of the polymerization will be sufficient to produce a first segment which has a number average molecular weight which is within the range of about 5,000 to about 350,000.

The living polydiene segment produced in the first step of the polymerization is then utilized to initiate the terpolymerization of 1,3-butadiene, isoprene, and styrene. It is important for this step of the polymerization to be conducted in the presence of at least one polar modifier at a temperature which is within the range of about 5° C. to about 70° C. The polar modifier will normally be employed at a level which is sufficient to cause the repeat units in the final segment of the rubbery polymer to be in an essentially random order. The amount of monomers utilized will be sufficient for the final segment to have a number average molecular weight which is within the range of about 25,000 to about 350,000.

The subject invention more specifically reveals a process for preparing a rubbery polymer which has an excellent combination of properties for use in making tire treads which comprises: (a) polymerizing a conjugated diene monomer with a lithium initiator in the substantial absence of polar modifiers at a temperature which is within the range of about 5° C. to about 100° C. to produce a living polydiene segment having a number average molecular weight which is within the range of about 25,000 to about 350,000; and (b) utilizing the living polydiene segment to initiate the terpolymerization of 1,3-butadiene, isoprene, and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene, and styrene, wherein the final segment has a number average molecular weight which is within the range of about 25,000 to about 350,000.

The present invention also discloses a rubber polymer which has an excellent combination of properties for use in making tire treads which is comprised of repeat units which are derived essentially from at least one conjugated diene monomer, wherein the first segment has a number average molecular weight which is within the range of about 25,000 to about 350,000; and (b) a final segment which is comprised of repeat units which are derived from 1,3-butadiene, isoprene, and styrene, wherein the repeat units in the final segment are in essentially random order, and wherein the final segment has a number average molecular weight which is within the range of about 25,000 to about 350,000.

DETAILED DESCRIPTION OF THE INVENTION

In the first step of the process of this invention, at least one conjugated diene monomer is polymerized to a molecular weight which is within the range of about 25,000 to about 350,000. The polymerization is carried out in an inert organic medium utilizing a lithium catalyst. This polymerization step is carried out without employing a polar modifier. It is important to conduct this polymerization step in the absence of significant quantities of polar modifiers to attain the desired microstructure. For example, in the case of isoprene, there will be from about 75% to about 98% 1,4-linkages and from about 2% to about 25% 3,4-linkages. It is typically preferred for such polyisoprene segments to have a microstructure wherein there are from about 80% to about 95% 1,4-linkages and from about 5% to about 20% 3,4-linkages. In cases where 1,3-butadiene is polymerized in the first step, the repeat units which are derived from 1,3-butadiene will have a low vinyl microstructure (about 6% to about 10% vinyl).

The inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The lithium catalysts which can be used are typically organolithium compounds. Organo monolithium compounds, such as alkyllithium compounds and aryllithium compounds, are usually employed. Some representative examples of organo monolithium compounds that can be utilized include ethylaluminum, isopropylaluminum, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium, and the like. Normal-butyllithium and secondary-butyllithium are highly preferred lithium catalysts.

The amount of lithium catalyst utilized will vary from one organolithium compound to another and with the molecular weight that is desired for the first segment being synthesized. As a general rule, from about 0.01 phm (parts per hundred parts by weight of monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst.

Normally, from about 5 weight percent to about 35 weight percent of the conjugated diene monomer will be charged into the polymerization medium (based upon the total weight of the polymerization medium including the organic solvent and monomers). In most cases, it will be preferred for the polymerization medium to contain from about 10 weight percent to about 30 weight percent monomers. It is typically more preferred for the polymerization medium to contain from about 20 weight percent to about 25 weight percent monomers.

The conjugated diene monomer will be polymerized at a temperature which is within the range of about 5° C. to about 100° C. The polymerization temperature will preferably be within the range of about 40° C. to about 90° C. to attain the desired microstructure for the first segment. Temperatures within the range of about 60° C. to about 80° C. are most preferred. The microstructure of the first polymeric segment being prepared is somewhat dependent upon the polymerization temperature. For instance, lower temperatures will cause polyisoprene to have a greater quantity of 3,4-microstructure. In cases where isoprene is used, the polyisoprene segments will contain from about 75% to 95% 1,4-structure and from about 2% to about 25% 3,4-structure. It is typically preferred for such polyisoprene segment to contain from about 80% to about 95% 1,4-microstructure and from about 5% to about 20% 3,4-microstructure. As a general rule, it is most preferred for such polyisoprene segments to contain from about 87% to about 93% 1,4-microstructure and from about 7% to about 13% 3,4-microstructure.

It is generally preferred for 1,3-butadiene to be utilized as the conjugated diene monomer in the preparation of the first segment of the rubbery polymer. In other words, it is preferred for the repeat units in the first segment of the rubbery polymer to be derived from 1,3-butadiene monomer. However, good results can also be realized in cases where isoprene is utilized as the conjugated diene monomer in the preparation of the first segment of the rubbery polymer. Such rubbery polymers will contain a first segment with the repeat units therein being derived essentially from isoprene.

It is also possible to prepare the first segment by polymerizing a mixture of various conjugated diene monomers. Various mixtures of conjugated diene monomers and vinyl aromatic monomers can also be utilized in the preparation of the first segment. In such cases, the various monomers will typically polymerize at different rates. This results in the various monomers sequentially adding to the segment based upon their rate of reactivity. In any case, because the diene monomers have a much faster rate of reactivity than vinyl aromatic monomers, the first segment of the rubbery polymer will be comprised of repeat units which are derived essentially from conjugated diene monomers. However, in cases where vinyl aromatic monomers are included in the first polymerization step, there will be a block located between the first segment and the final segment which is comprised of repeat units which are derived essentially from the conjugated diolefin monomer.

A combination of isoprene, 1,3-butadiene and styrene can be employed in making the first segment. In such cases normally from about 5 to about 40 weight percent styrene, from about 5 to about 70 weight percent 1,3-butadiene, and from about 5 to about 70 weight percent isoprene will be used. It is generally preferred for such segments to contain from about 10 to about 30 weight percent styrene, from about 10 to about 50 weight percent 1,3-butadiene, and from about 10 to about 50 weight percent isoprene.

The polymerization in the first step of the process is allowed to continue until essentially all of the monomers have been exhausted. In other words, the polymerization is allowed to run to completion. Since a lithium catalyst is employed to polymerize the conjugated diene monomer, a living polydiene segment is produced. In cases where vinyl aromatic monomers are included in the first polymerization step, a living polydiene segment having a vinyl aromatic block at the end thereof will be produced. The living polydiene segment synthesized will have a number average molecular weight which is within the range of about 25,000 to about 350,000.

The living polydiene segment will preferably have a molecular weight which is within the range of about 50,000 to about 200,000 and will more preferably have a number average molecular weight which is within the range of about 70,000 to about 150,000.

The second step in the process of this invention involves utilizing the living polydiene segment to initiate the terpolymerization of 1,3-butadiene monomer, isoprene monomer and styrene monomer. This terpolymerization is carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl 1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl 1,2,4-trimethoxybenzene, and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and U.S. Pat. No. 4,696,986 are incorporated herein by reference in their entirety. The microstructure of the repeat units which are derived from conjugated diene monomers is a function of the polymerization temperature and the amount of polar modifier present. For example in the polymerization of 1,3-butadiene, it is known that higher temperatures result in lower vinyl contents (lower levels of 1,2-microstructure). Accordingly, the polymerization temperature, quantity of modifier and specific modifier selected will be determined with the ultimate desired microstructure of the polymer segment being synthesized being kept in mind.

In the second step of the process of this invention, the final polymeric segment is synthesized. This is typically carried out by adding the polar modifier and the 1,3-butadiene, isoprene and styrene monomers to the medium containing the living polydiene segment made in the first step. This is accomplished by first adding the modifier to the medium containing the living polydiene segment and subsequently adding the styrene, isoprene, and 1,3-butadiene. Additional solvent can also be added, if necessary, to maintain the total amount of monomers and polymer within the polymerization medium within the range of about 5 to about 35 weight percent (based upon the total weight of the polymerization medium including monomers, polymer and solvent). It is desirable to add a sufficient amount of solvent so as to maintain the total amount of polymer and monomers within the range of about 10 to about 30 weight percent and preferably within the range of about 20 to about 25 weight percent, based upon the total weight of the reaction medium.

The repeat units in the final segment are, of course, derived from 1,3-butadiene, isoprene and styrene. The final segment will typically be comprised of from about 5 weight percent to about 60 weight percent repeat units which are derived from styrene, from about 10 to about 80 weight percent repeat units which are derived from isoprene, and from about 10 weight percent to about 70 weight percent repeat units which are derived from 1,3-butadiene. It is normally preferred for the final segment to contain from about 10 weight percent to about 45 weight percent repeat units which are derived from styrene, from about 30 to about 70 weight percent repeat units which are derived from isoprene, and from about 15 weight percent to about 40 weight percent repeat units which are derived from 1,3-butadiene. It is most preferred for the final segment to contain from about 20 weight percent to about 30 weight percent repeat units which are derived from styrene, and from about 40 to about 60 weight percent repeat units which are derived from isoprene and from about 20 weight percent to about 30 weight percent repeat units which are derived from 1,3-butadiene.

In the second segment, the distribution of repeat units derived from styrene, isoprene and butadiene is essentially random. The term "random" as used herein means lacking a definite pattern. As a general rule, less than 1% of the total quantity of repeat units derived from styrene are in blocks containing four or more styrene repeat units. In other words, more than 99% of the repeat units derived from styrene are in blocks containing less than three styrene repeat units. A large quantity of repeat units derived from styrene will, of course, be in blocks containing one styrene repeat unit. Such blocks containing one styrene repeat unit are bound on both sides by repeat units which are derived from 1,3-butadiene or isoprene.

The terpolymerization of butadiene, isoprene and styrene can be conducted at the same temperature which is used in the synthesis of the first segment. However, this terpolymerization will be carried out at a temperature which is within the range of about 5° C. to about 70° C. The terpolymerization will preferably be conducted at a temperature which is within the range of about 10° C. to about 40° C. and will most preferably be conducted at a temperature which is within the range of 15° C. to 30° C.

The second polymerization step is normally allowed to continue until the monomers are exhausted. In other words, the terpolymerization is allowed to continue until the polymerization reaction is complete. A sufficient quantity of monomers will be utilized to attain a number average molecular weight for the final segment which is within the range of about 25,000 to about 350,000. It is normally preferred for the second segment to have a number average molecular weight which is within the range of 50,000 to 200,000 with number average molecular weights within the range of 70,000 to 150,000 being most preferred.

The ratio of the number average molecular weight of the first segment to the number average molecular weight of the final segment with typically be within the range of about 25/75 to about 75/25. This ratio plays a role in determining the morphology of the polymer and will usually be within the range of about 35/65 to about 65/35. The Moony ML (1+4) viscosity of the segmented rubbery polymers of this invention will generally be greater than about 65 and less than about 100. It is normally preferred for the Moony ML (1+4) viscosity of the rubbery polymer to be within the range of 70 to 85 with Moony ML (1+4) viscosities within the range of 75 to 80 being most preferred.

After the copolymerization has been completed, the segmented rubbery polymer can be recovered from the organic solvent. The segmented rubbery polymer can be recovered from the organic solvent and residue by any means, such as decantation, filtration, centrification and the like. It is often desirable to precipitate the segmented rubber from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the segmented polymer from the polymer cement also "kills" the living polymer by inactivating lithium end groups. After the segmented polymer is recovered from the solution, steam stripping can be employed to reduce the level of volatile organic compounds in the segmented polymer.

There are valuable benefits associated with utilizing the segmented rubbery polymers of this invention in making tire tread compounds. Tire tread compounds can be made using these segmented polymers without the need to blend additional rubbers therein. However, in many cases, it will e desirable to blend the segmented elastomer with one or more additional rubbers to attain the desired performance characteristics for the tire tread compound. For instance, the segmented rubber can be blended with natural rubber to make tread compounds for passenger tires which exhibit outstanding rolling resistance, traction and tread wear characteristics. Such blends will normally contain from about 5 to about 40 weight percent natural rubber and from about 60 to about 95% of the segmented elastomer. High performance tires which exhibit very exceptional traction characteristics, but somewhat comprised tread wear, can be prepared by blending the segmented elastomer with solution or emulsion styrene-butadiene rubber (SBR). In cases where tread wear is of greater importance than traction, high cis-1,4-polybutadiene can be substituted for the SBR. In any case, the segmented rubbers of this invention can be used to improve the traction, tread wear and rolling resistance of tires made therewith.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLES 1-3

In this series of experiments, high performance rubbery elastomers were prepared utilizing the techniques of this invention. The high performance segmented rubbers synthesized in this series of experiments were comprised of a first segment which consisted of repeat units which were derived from 1,3-butadiene and a second segment which consisted of repeat units which were derived from styrene, isoprene, and 1,3-butadiene. The repeat units derived from styrene, isoprene, and 1,3-butadiene in the final segment of these segmented polymers were in random order.

The segmented polymers prepared in this series of experiments were synthesized in a one-gallon (3.8 liter) polymerization reactor. In the procedure used, 1,000 grams of a premix solution containing 17.6% 1,3-butadiene monomer was charged into the polymerization reactor. The monomer premix solution had been previously scavenged for impurities with a n-butyllithium solution. Polymerization was initiated by the addition of 1.4 ml of a 1.1M solution of n-butyllithium. The reactor was maintained at a temperature of about 65° C. until essentially complete conversion had been achieved.

At this point, 1.15 ml of a 5.37M solution of 2,2-ditetrahydrofuryl propane (DTP) was added to the reactor. Then, 1,000 grams of a premix solution containing styrene, isoprene, and 1,3-butadiene was added. The premix monomer solution contained a ratio of styrene to isoprene to 1,3-butadiene of 25:50:25. The polymerization was continued until an essentially complete conversion was attained. The reaction temperature utilized is shown in Table I.

The three segmented polymers synthesized in this series of experiments displayed two glass transition temperatures which were within the ranges of about −93° C. to about −95° C. and about 0° C. to 10° C. The microstructure of the segmented polymers prepared is also shown in Table I.

EXAMPLE 4

In this experiment a high performance segmented rubber was prepared utilizing essentially the same procedure as is described in Examples 1-3. However, in this experiment, isoprene was substituted for 1,3-butadiene in the first step of the polymerization. Accordingly, the segmented rubber made in this experiment had a first block which was comprised of repeat units which were derived from isoprene. The polymer produced exhibited a single glass transition temperature at −52° C. The microstructure of the polymer made is reported in Table I. In all of these synthesis procedures, the polymerization medium was shortstopped with methanol and the segmented polymer was stabilized with 1 phr (parts per hundred parts of rubber) of an antioxidant. The segmented rubbers were subsequently recovered by evaporating the solvent in a vacuum oven which was maintained at a temperature of 122° F. (50° C.) It took approximately 24 hours for the drying to be completed.

TABLE I

| Example | Pzm. Temp. for Final Segment | Tg | Mooney ML-4 | 1,2-PBd | 1,4-PBd | 1,2-PI | 3,4-PI | 1,4-PI | Sty |
|---|---|---|---|---|---|---|---|---|---|
| 1 | 23° C. | −93 + 7 | 79 | 10 | 52 | 5 | 19 | 3 | 13 |
| 2 | 65° C. | −95 + 0 | 64 | 10 | 52 | 4 | 19 | 4 | 14 |
| 3 | 18° C. | −95 + 10 | 66 | 10 | 52 | 5 | 20 | 2 | 14 |
| 4 | 65° C. | −52 | 65 | 7 | 5 | 3 | 25 | 48 | 14 |

The high performance segmented rubbers which were recovered were then compounded utilizing a standard formulation which included carbon black, sulfur, natural rubber, and an accelerator. The natural rubber was included in the blend at a 1:1 ratio to the segmented polymer. However, in Example 2B and 4B, the compound made did not include any natural rubber. In other words the compound cured in Example 2B contained only the segmented polymer. The viscoelastic properties of these cured blends is reported in Table II.

TABLE II

| Example | Tan Delta at 0° C. | Tan Delta at 60° C. |
|---|---|---|
| 1 | 0.301 | 0.083 |
| 2A | 0.245 | 0.090 |
| 2B | 0.281 | 0.089 |
| 3 | 0.232 | 0.082 |
| 4A | 0.231 | 0.111 |
| 4B | 0.476 | 0.123 |

Table II shows that the segmented polymers of this invention exhibit low tan delta values at 60° C. while exhibiting very high tan delta values at 0° C. Low tan delta values at 60° C. are indicative of good rolling resistance when incorporated into tire treads and high tan delta values at 0° C. are indicative of good traction characteristics. Accordingly, tire treads can be made with the segmented polymers of this invention which have both improved traction characteristics and rolling resistance. Example 1 depicts an excellent tire tread compound which will provide outstanding traction, tread durability and rolling resistance. This is because it exhibits a tan delta at 0° C. of greater than 0.3 while displaying a tan delta at 60° C. of less than 0.090. The compound depicted in Example 4B could be used in tires to provide exceptional traction characteristics with somewhat compromised rolling resistance. Such compounds would, of course, be highly desirable in high performance tires. In any case, the compound depicted in 4B displays a tan delta at 0° C. of greater than 0.40 which is indicative of superb traction characteristics. Nevertheless, the compounds made in Example 4B still maintains a tan delta at 60° C. of less than 0.150. Such compounds which exhibit large differences between the tan delta value at 0° C. and their tan delta value at 60° C. offer an array of advantages in tire tread compounding applications. For instance, it is generally considered to be good for the difference between tan delta at 0° C. and tan delta at 60° C. to be 0.150 or greater. It is excellent for the difference between tan delta at 0° C. and the tan delta at 60° C. to be 0.2 or greater and it is very exceptional for this difference in tan delta values to be greater than 0.25.

Variations in the present invention are possible in light of the description of it provided herein. It is, therefore, to be understood that changes can be made in the particular embodiments described which will be within the full intended scope of the invention as defined by the following appended claims.

What is claimed is:

1. A rubber polymer which has an excellent combination of properties for use in making tire treads which consists of (a) a first segment which consists of repeat units which are derived from 1,3-butadiene, wherein the first segment has a number average molecular weight which is within the range of about 25,000 to about 350,000, wherein the repeat units derived from 1,3-butadiene have a vinyl content which is between 6% and 10%; and (b) a final segment which consists of repeat units which are derived from 1,3-butadiene, isoprene, and styrene, wherein the repeat units in the final segment are in essentially random order, and wherein the final segment has a number average molecular weight which is within the range of about 25,000 to about 350,000.

2. A rubbery polymer as specified in claim 1 wherein the final segment is comprised of repeat units which are derived from about 30 to about 70 weight percent isoprene, from about 15 to about 40 weight percent 1,3-butadiene, and from about 10 to about 45 weight percent styrene.

3. A rubbery polymer as specified in claim 1 wherein the final segment is comprised of repeat units which are derived from about 40 to about 60 weight percent isoprene, from about 20 to about 30 weight percent 1,3-butadiene, and from about 20 to about 30 weight percent styrene.

4. A rubbery polymer as specified in claim 2 wherein the Mooney ML (1+4) viscosity of the rubbery polymer is within the range of about 70 to about 85.

5. A rubbery polymer as specified in claim 1 wherein the number average molecular weight of the first segment is within the range of about 50,000 to about 200,000 and wherein the number average molecular weight of the final segment is within the range of about 50,000 to about 200,000.

6. A rubbery polymer as specified in claim 2 wherein the number average molecular weight of the first segment in within the range of about 70,000 to about 150,000 and wherein the number average molecular weight of the final segment is within the range of about 70,000 to about 150,000.

7. A rubbery polymer as specified in claim 6 wherein the rubbery polymer has a Mooney ML (1+4) viscosity which is within the range of about 75 to about 80.

8. A process for preparing a rubbery polymer which has an excellent combination of properties for use in making tire treads which consists essentially of: (a) homopolymerizing 1,3-butadiene with a lithium initiator in the substantial absence of polar modifiers at a temperature which is within the range of about 5° C. to about 100° C. to produce a living polydiene segment having a number average molecular weight which is within the range of about 25,000 to about 350,000 and a vinyl content which is between 6% and 10%; and (b) utilizing the living polybutadiene segment to initiate the terpolymerization of a monomer mixture consisting of 1,3-butadiene, isoprene, and styrene, wherein the terpolymerization is conducted in the presence of at least one polar modifier at a temperature which is within the range of about 5° C. to about 70° C. to produce a final segment which consists of repeat units which are derived from 1,3-butadiene, isoprene, and styrene, wherein the final segment has a number average molecular weight which is within the range of about 25,000 to about 350,000.

9. A process as specified in claim 8 wherein the terpolymerization of step (b) is conducted at a temperature which is within the range of about 10° C. to about 40° C.

10. A process as specified in claim 8 wherein the terpolymerization of step (b) is carried out at a temperature which is within the range of about 15° C. to about 30° C.

11. A process as specified in claim 8 wherein the monomers terpolymerized in step (b) are comprised of 30 to 70 weight percent isoprene, from 15 to 40 weight percent 1,3-butadiene, and from 10 to 45 weight percent styrene.

12. A process as specified in claim 9 wherein the monomers terpolymerized in step (b) are comprised of from about 40 to about 60 weight percent isoprene, from about 20 to about 30 weight percent 1,3-butadiene, and from about 20 to about 30 weight percent styrene.

13. A rubbery polymer as specified in claim 6 wherein the rubbery polymer has a Mooney ML (1+4) viscosity which is within the range of about 70 to about 85.

* * * * *